United States Patent
Stoll

(10) Patent No.: US 7,210,163 B2
(45) Date of Patent: Apr. 24, 2007

(54) METHOD AND SYSTEM FOR USER AUTHENTICATION AND AUTHORIZATION OF SERVICES

(75) Inventor: Louis Stoll, Minnetonka, MN (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/380,415

(22) PCT Filed: Jul. 19, 2002

(86) PCT No.: PCT/US02/22969

§ 371 (c)(1),
(2), (4) Date: Oct. 31, 2003

(87) PCT Pub. No.: WO03/009201

PCT Pub. Date: Jan. 30, 2003

(65) Prior Publication Data

US 2004/0139030 A1 Jul. 15, 2004

(51) Int. Cl.
*G06F 17/60* (2006.01)
(52) U.S. Cl. .............................. 726/2; 726/8; 713/182; 705/4; 707/9
(58) Field of Classification Search ................ 713/201, 713/182; 726/2, 8; 705/4; 707/9
See application file for complete search history.

(56) References Cited

U.S. PATENT DOCUMENTS

| | | | |
|---|---|---|---|
| 5,689,566 A | 11/1997 | Nguyen | |
| 5,930,792 A * | 7/1999 | Polcyn | 707/9 |
| 6,141,778 A * | 10/2000 | Kane et al. | 726/4 |
| 6,161,185 A | 12/2000 | Guthrie et al. | |
| 6,330,551 B1 * | 12/2001 | Burchetta et al. | 705/80 |
| 6,516,315 B1 * | 2/2003 | Gupta | 707/9 |
| 6,640,307 B2 * | 10/2003 | Viets et al. | 726/15 |
| 6,668,322 B1 * | 12/2003 | Wood et al. | 713/182 |
| 2001/0044733 A1 * | 11/2001 | Lee et al. | 705/4 |
| 2001/0047489 A1 | 11/2001 | Ito et al. | |
| 2002/0022976 A1 * | 2/2002 | Hartigan | 705/4 |
| 2002/0035516 A1 | 3/2002 | Arima | |
| 2003/0163438 A1 * | 8/2003 | Barnett et al. | 707/1 |
| 2005/0240451 A1 * | 10/2005 | Johnson et al. | 705/4 |

FOREIGN PATENT DOCUMENTS

WO    WO 01/27897    * 4/2001

\* cited by examiner

*Primary Examiner*—Taghi T. Arani
(74) *Attorney, Agent, or Firm*—Staas & Halsey LLP

(57) ABSTRACT

An extended authorization system and method implementing a second layer of access authorization. The first layer of access authorization corresponds to conventional access authorization processing such as, for example, validating an entered user identifier and password. The second layer of access authorization determines if the user has a valid contractual or other business relationship with an information system provider. The status and type of contractual or other business relationship may determine user access privileges which allow the user to access services provided by an information system. When a user has a valid contractual or other business relationship with an information system provider, first layer authorization login data such as, for example, a user identifier and password may be generated for the user.

12 Claims, 2 Drawing Sheets

METHOD AND SYSTEM FOR USER AUTHENTICATION AND AUTHORIZATION OF SERVICES

FIELD OF THE INVENTION

The present invention relates to a method and system for authenticating a user and for authorizing services according to the authentication.

BACKGROUND INFORMATION

In order to regulate access to computer systems, networks, and information systems, authentication procedures have been established to implement basic levels of security. The most common authentication procedure is the use of login information such as, for example, a user identification (e.g., user name) and password, to restrict the access to a computer system, network, and/or information system to designated individuals. This basic authentication model is the standard conventional means of implementing access control on computer systems, networks, and information systems. Other less widely used authentication models include, among others, security keys (e.g., radio frequency cards) which work in a similar manner by matching a code associated with the key to a code that has been permitted access to the system in question. One alternative example of the conventional basic authentication model is the use of radio frequency codes (e.g., on radio frequency cards) to provide login information (e.g., user identifier) to a system. Though the technical media is different, the basic authentication model functions in the same way as for the more standard keying in of user identification and password data.

Some authentication models may use the login information (e.g., user name and password or radio frequency code) to determine the services provided to the user upon login. Service determination in these conventional embodiments is based on the information used in the basic authentication model (e.g., user name and password or radio frequency code) and does not contemplate other considerations that may be pertinent in determining the services presented to a user. For example, users accessing an information system of an insurance provider may all be given access to the same services instead of tailoring the services offered according to the type of policy in effect between the user and the bank. This limitation on tailoring services is based on the restricted authentication criteria (e.g., user name and password) used in making the service determination. In order to overcome this limitation, some systems may designate specific services for each user. However, these services are still determined by the user login information (i.e., the allowed services are linked to the user login information). The conventional means for access authorization is limited by the reliance on the login information in determining access privileges and services.

Moreover, a common feature in virtually all conventional authentication models regulating access to computer systems, networks, and information systems is the binary nature of the authentication either granting or denying access based on matching a user's login data or code with an associated system recognized value. For example, if a user name and password entered by a user matches data in a record/row in a security database of an information system, the user is granted access to the information system. Otherwise, the user is denied access. Intermediate processing is not available whereby a user may be granted access based on other considerations such as the user's contractual relationship with the computer system, network, and/or information systems provider. This represents a further limitation imposed by conventional authentication models.

SUMMARY

The present invention solves for these limitations by implementing an extended authentication model greatly increasing the flexibility of the authorization process. In one embodiment of the present invention, the conventional authentication process using login information (e.g., user identifier and password) may first be implemented. According to this embodiment, verification of a user's valid contractual relationship with an information system provider may then be determined. The extension of the authentication model to include the verification of a valid contractual relationship may provide greater security and control over attempts to access an information system. On the success of the login information authentication and verification of a user's contractual relationship, the services available to the user may then be determined according to one embodiment of the present invention.

The status and type of contractual relationship between the user and an information system provider may assist in determining an access privilege granted to the user according to one embodiment of the present invention. An access privilege may be a permission to use a particular service such as, for example, a program, a link, and/or a set of data. Access privileges may be granted to a user for services that are associated with a particular type of contractual relationship matching the contractual relationship between the user and an information system provider according to one embodiment of the present invention. For example, if a service exists to show the accumulated cash value in a life insurance contract, a user may be granted an access privilege for this service if the user has a whole or universal life insurance policy (both allow accumulation of cash values) with an insurance provider, providing the information system. In this example, the service is associated with a type of contractual relationship (a life insurance contract allowing accumulated cash values) matching the user's contractual relationship (a whole or universal life insurance policy) with the information system provider (i.e., the insurance provider). If the user instead had a term life insurance policy (no accumulation of cash value in the policy), the access privilege may not be granted because the service does not match the contractual relationship according to this embodiment of the present invention.

In one embodiment of the present invention, a valid contractual relationship between a user and an information system provider may be used to generate a user's login information such as, for example, a user identifier (e.g., user name) and a password. If login information does not already exist for a user, it may automatically be generated if the user has a valid (e.g., not expired or lapsed) contractual relationship with the information system provider. In an exemplary embodiment of the present invention, user login information (e.g., account information) may be generated independent from a user attempt to access an information system. In an alternative embodiment, user login information may be generated during a user attempt to access an information system.

DETAILED DESCRIPTION

The present invention provides enhanced and extended computer account authentication and authorization permitting greater flexibility in addressing the needs of users and information system providers. In one embodiment of the present invention, a user's valid contractual relationship with an information system provider may be verified after validating a user's login information (e.g., user identification and password). This extension of the authentication model provides a second level of security and only allows a user to access the information system when the user has a commercial (i.e., contractual) interest in the information system.

In addition to controlling user access according to the existence of a valid contractual relationship, the status and type of the contractual relationship may be used in determining the access privileges granted to the user according to one embodiment of the present invention. An access privilege may be a permission to use a particular service such as, for example, a program, a menu option, a link, and/or a set of data. Services may be associated with particular types and/or statuses of contractual relationship. The type and status of a user's contractual relationship with an information system provider may be used to find the associated services and to grant the user access privileges to allow the user to use these services. The user access privileges may also be used in establishing a data page(s) containing the authorized services. Upon successful completion of the extended authentication model (further discussed below), the data page(s) may be displayed for the user.

In one embodiment of the present invention, the user's contractual relationship with the information system provider may be used to generate a user's login information (e.g., user identification and password) if it does not already exist. For example, if user login information has not yet been established and the user has a valid contractual relationship with the information system provider, the login information may be generated based on the contractual relationship information and the user may be able to access the information system. In an exemplary embodiment of the present invention, user login information may be generated independent from a user attempt to access the information system. In an alternative embodiment of the present invention, user login information may be generated during a user attempt to access the information system.

Figure 1:
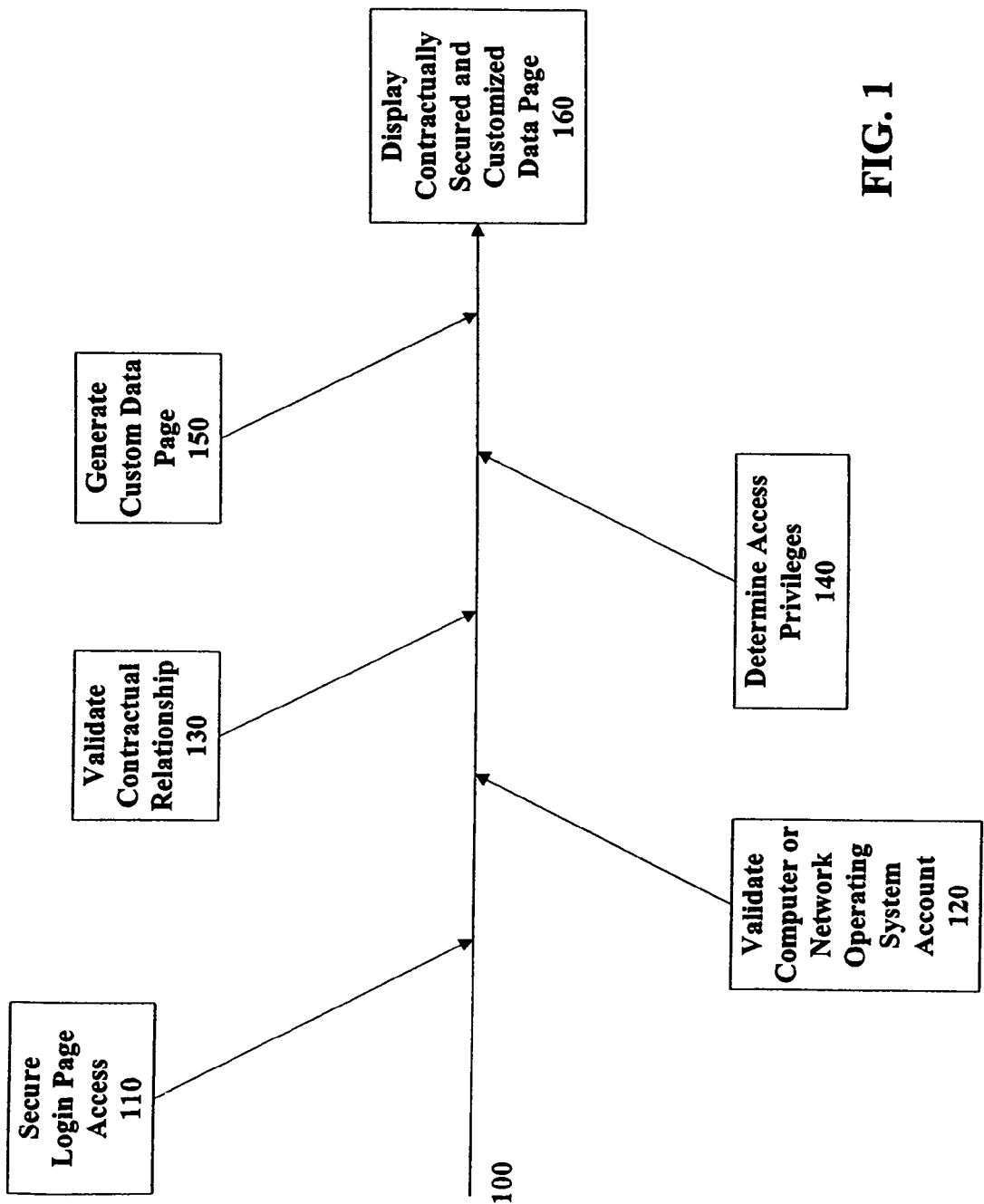
FIG. 1 is a block diagram displaying a time line of the extended authentication model according to one embodiment of the present invention.

FIG. 1. is a block diagram displaying a time line of the extended authentication model according to one embodiment of the present invention. FIG. 1 shows a general time line 100 for the extended authentication model beginning on the left (earliest time) and progressing to the right (latest time). This time line may commence when a user attempts to access an information system implementing the present invention. The user access attempt may first initiate the use of a secure login page 110. Using a secure login page to access an information system is a conventional process generally involving the use of encryption to protect the transmission of user login information such as, for example, user identification (e.g., user name) and password. In an exemplary embodiment of the present invention, the securely transmitted user login information may then be used for the validation of a user's computer and/or network operating system account 120. These first two steps 110, 120 along the extended authentication model time line typically correspond to most conventional authentication processes for users trying to access an information system.

After login account validation occurs 120, a user's relationship with the information system provider may be validated 130 in order to determine whether a currently valid contractual or other relationship exists according to an exemplary embodiment of the present invention. Validating a contractual or other relationship (i.e., determining user eligibility as discussed below) allows the extended authentication model to further control access to the information system. For example, the status of a user's contractual or other relevant relationship with an information system provider may be used to deny the user access to an information system even when the user has valid login information (e.g., a user identification and password). Such a situation may occur when a contractual relationship becomes, for example, inactive, lapses, or expires. A conventional authentication model and system may not be able to adequately (in terms of ability and/or timeliness) compensate for these relationship changes and may therefore allow access to an information system. The extended authentication model, by performing a contractual relationship validation 130, may avoid providing access under these circumstances. Therefore, the present invention may be able to contractually (or by means of another relationship) secure a user's access to an information system.

The validation of a contractual or other user relationship with an information system provider may entail the use of business rules to match user login information (e.g., a user identification and password) with one or more business databases. In one embodiment of the present invention, a special database containing relevant contractual and/or other information may be used. For example, this special database (referred to as the eligibility database in FIG. 2 and below) may contain contract number, contract holder identifier, contract holder name, contract holder address, contract holder contact phone number, contract holder date of birth, contract holder social security number, and/or contract expiration date. In an example of matching according to one embodiment of the present invention, a user identification from the login information may be compared with a contract holder identifier field/attribute in the one or more business databases. According to this example, if a match is found, the contract expiration data may be used to determine whether the contractual relationship is still valid.

A determination of a user's access privileges 140 may then be made according to an exemplary embodiment of the present invention. Access privileges define which services such as, for example, programs, data, features, menu options, and other elements of the information system a user is granted access. Access privileges may be determined by the type and nature of a user's contractual and/or other relationship with an information system provider. For example, if a user has a variable universal life insurance policy with an insurance provider (also the information system provider in this example), the user may be granted access to portfolio management applications allowing the user to transfer some or all of the accumulated cash value of the policy between select mutual and/or other investment funds. The access privileges, in addition to defining the rights and permissions of the user in accessing the services of the information system, may also determine the manner in which information is presented to the user according to one embodiment of the present invention.

The access privileges granted to a user 140 may be used to generate or assign a customized data page 150 for the user according to one embodiment of the present invention. The generated or assigned data page refers to one or more data pages that may contain content (e.g., data, programs, etc.) and links to additional content. The access privileges determine what content and links may be displayed. In an example embodiment of the present invention, a separate customized data page is generated for each user. In an alternative embodiment of the present invention, a data page may be shared between users having a similar set of access privileges. The generation and assigning of a data page is further discussed below along with FIG. 2.

The end result of the extended authentication model is a contractually secured and customized data page 160 made available to the user according to one embodiment of the present invention. Unlike conventional authentication systems, the validation of a user's contractual relationship allows for the generation or assigning of a customized data page whose contents may be directly related to the user's contractual or other relationship with the information system provider. For this reason, user access to the information system is not only vetted by account security (e.g., user login information such as user identification and password) but is also scrutinized according to the contractual relationship between the user and information system provider. The result of this further scrutiny is a custom tailored display of content including services such as, for example, data, links, and programs that may be regulated through access privileges. These access privileges may be assigned to a user based on the user's contractual relationship and may also be based on a group or class of contractual relationship in which the user is categorized.

The extended authentication model time line depicted in FIG. 1 provides a general framework of one embodiment of the present invention. The extended authentication model may be further examined in greater detail according to the flowchart shown in FIG. 2.

Figure 2:
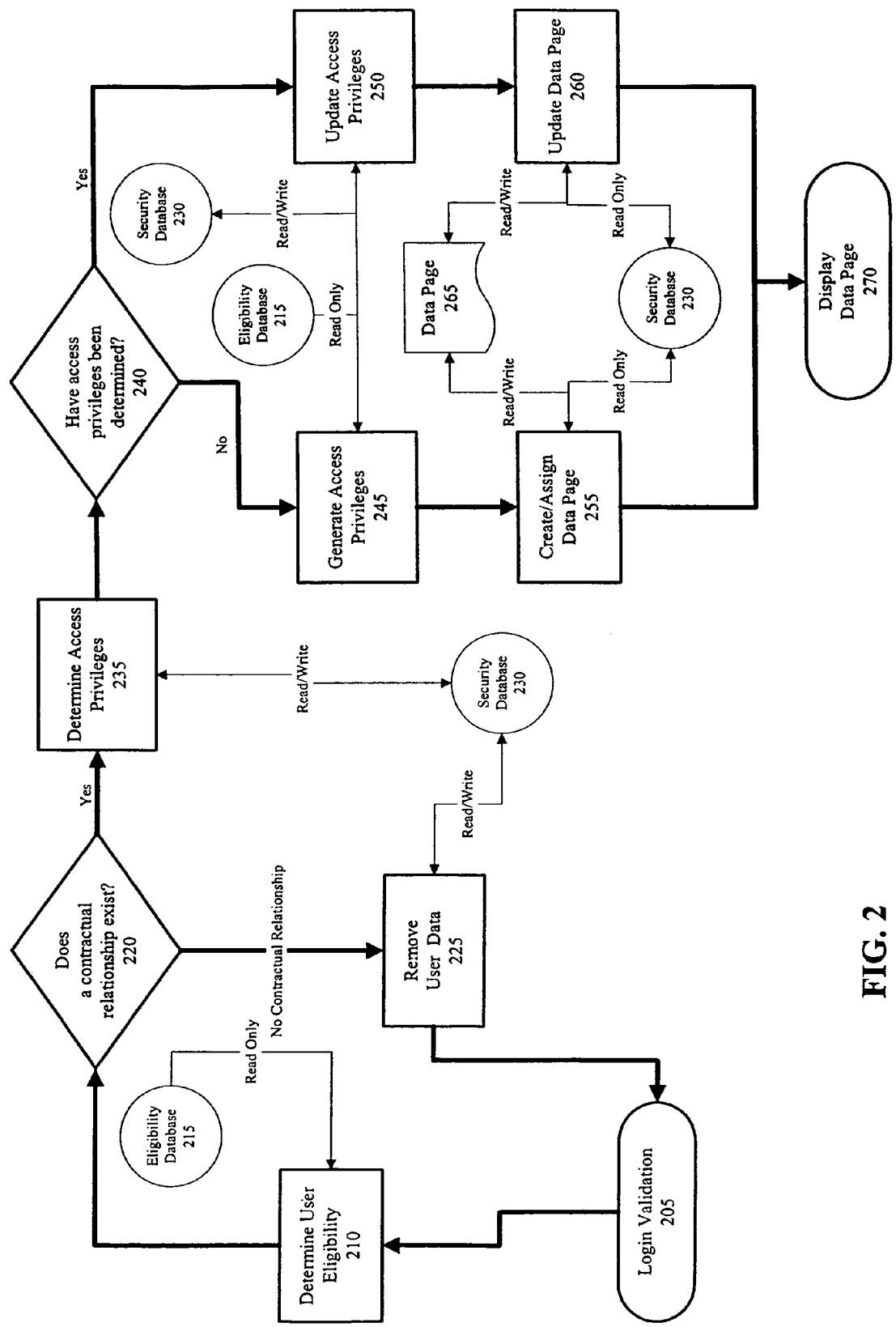
FIG. 2 is a flowchart describing the extended authentication model according to one embodiment of the present invention.

FIG. 2 is a flowchart describing the extended authentication model according to one embodiment of the present invention. The extended authentication model may commence after a user login attempt on a login page is validated 205 according to conventional computer and/or network account validation. The login page may be any software program page or screen that allows a user to enter their login information (e.g., user identification and password) and/or any third party authentication necessary to login to a user account maintained by an information system provider. In the example embodiment of the present invention, a single login page is used. However, in alternative embodiments of the present invention, multiple login pages may be used to allow a user to enter their authentication information. Also, according to the environment in which the extended authentication model is used, the login page may be secured by encryption or other means in one embodiment of the present invention. For example, in an environment where a user accesses an information system over the Internet, a secure Web page may serve as the login page. Upon accessing the login page, a user may enter the login information such as, for example, their user identification and password. If the login information is successfully validated 205, the authentication process proceeds: otherwise, it is terminated.

After the login validation 205, the present invention may make a further determination of the user eligibility 210 to access the information system according to one embodiment of the present invention. The user eligibility determination 210 may involve ascertaining whether the user has a valid contractual relationship with the information system provider. For example, if the information system provider is an insurance provider, the user eligibility determination 210 may involve ascertaining whether the user has one or more insurance contracts with the insurance provider. The user eligibility determination 210 may be more selective than only determining whether the user has one or more insurance contracts with the insurance provider by further determining whether the user has at least one valid (e.g., currently in force) insurance contract with the insurance provider. In another example, if the information system provider is a provider of Web content, the user eligibility determination 210 may involve ascertaining whether the user has registered with the Web content provider and approved the licensing agreement.

In determining user eligibility 210, the user login information (e.g., user identification and password) may be matched with one or more databases in order to ascertain the existence and/or status of the user's relationship with the information system provider (e.g., determine whether the user has a valid contractual relationship with the information system provider). In one embodiment of the present invention, a special "eligibility" database 215 containing user contractual information (e.g., contract number, contract owner name, address, data of birth, and/or social security number) may be used to validate a user's eligibility 210 as part of the extended authentication model. According to this exemplary embodiment of the present invention, the user login information may be matched with the eligibility database 215 in order to determine the user's eligibility 210. In determining user eligibility 210, information is read from the database(s), such as the eligibility database, without writing information to the database(s) according to an exemplary embodiment of the present invention.

The user eligibility determination 210 identifies if the user is a valid customer or otherwise has a valid contractual relationship 220 with the information system provider. If the user fails the eligibility determination 210, 220, the user login information may be removed 225 from the information system and the user may no longer have login access to the system. According to one embodiment of the present invention, the login information may be removed 225 from a security database 230 or from the security tables of another database used for the initial login validation 205 as previously discussed. For example, a computer and/or network operating system database used by the computer and/or network operating system to provide at least basic electronic security database services may serve as the security database 230. According to an exemplary embodiment of the present invention, the security database 230 may comply with the Lightweight Directory Access Protocol ("LDAP"), a proposed directory protocol standard. In alternative embodiments of the present invention, the security database 230 may comply with other protocols in addition to or in place of LDAP.

If the user is a valid customer or otherwise has a valid contractual relationship 220 with the information system provider as determined by the user eligibility determination 210, validation of a user's access privileges 235 may then occur. User access privileges may determine what information and services a user will be given access to by the information system provider. In the exemplary embodiment of the present invention, the user access privileges may be stored in the LDAP security database 230 previously discussed. In an alternative embodiment of the present invention, the access privileges may be stored in one or more databases instead of or in addition to the security database 230.

If a user is accessing the information system for the first time, the determination of access privileges step 235 in the extended authentication model may include the assigning of an initial set of access privileges. These access privileges may be based on a group or class of the user. For example, if the information system provider is an insurance provider, the user may be belong to one or more insurance policy groups. An insurance policy group may be organized by functional type, for example, automobile insurance policies and life insurance policies, and may include subgroups such as, for example, term life insurance policies and whole life insurance policies according to one embodiment of the present invention. In an another example, if the information system provider is a bank, groups may be organized according to the type of account and/or level of deposits/loans. Assigning access privileges based on the contractual group of the user allows the system to provide a user with an initial specific set of services based on the group and directly related to the user's contractual relationship with the information system provider.

The determine access privileges step 235 may identify the services presented to a user according to one embodiment of the present invention. For example, these services may include menu options, programs, servlets/applets, features, and/or even the manner in which information is presented to the user. Determining the access privileges 235 may be necessary to determine what information and options are presented and how they are presented.

In performing the determine access privileges 235 validation, the information system may be able to ascertain whether access privileges have already been determined 240 for the user. A lack of established access privileges may indicate that this is the first user attempt to access the information system. If access privileges do not exist for a user, they may be created 245. As previously stated, according to one embodiment of the present invention, initial access privileges may be created according to a contractual group or class of the user. In order to create these access privileges 245, additional user information may be necessary and may be obtained from other information system provider databases such as the eligibility database 215. The new access privileges may then be written to the database(s) containing the access privilege data. For example, in one embodiment of the present invention, the LDAP security database 230 may be the appropriate database containing the access privilege information.

Upon creating the initial access privileges 245 for a user, an initial information system data screen or page may need to be generated 255. For example, a Web page 265 may need to be generated for a user. This initial data screen or page may contain the information and/or services granted to the user by the access privileges. For example, a Web page 265 may contain general information and links to other information and programs as granted by the access privileges and formatted specifically for the user or contractual group or class. The data page 265 does not need to be stored as a complete page by the information system and instead may be stored as a set of instructions and/or a combination of unique and shared files according to one embodiment of the present invention.

The data page 265, such as a Web page, may be unique to a user or may be shared by a number of users matching a particular profile of access privileges. In an exemplary embodiment of the present invention, a separate data page 265 may be generated 255 for each user. According to this embodiment, a new data page 265 needs to be created 255 each time a user first accesses the information system. In an alternative embodiment of the present invention, a data page 265 may be shared among a plurality of users sharing the same or similar access privileges and/or contractual relationships with the information system provider (e.g., a shared user profile). Naturally, the specific user contract, account, and other data will not be shared in this embodiment. According to this alternative embodiment, a new data page 265 may only need to be generated 255 if the user does not match an existing shared user profile. Otherwise, according to this alternative embodiment, the user may be assigned 255 the data page 265 corresponding to the shared user profile matching the user.

Once a data page 265 has been created and/or assigned to a user 255, it may be displayed 270 for the user thereby completing the extended authentication model for a new and/or first time user.

The information system may also ascertain during the access privileges step 235 whether a user's access privileges have already been determined 240. Already determined access privileges 240 for a user may indicate that this is not the first attempt of the user to access the information system. Even though access privileges may already exist 240, they may need to be updated 250 to reflect changes in the user contractual relationship with the information system provider. Access privileges may also need to be updated to reflect changes in the services such as data, programs, presentation, features, or other applications made available by the information system. As part of the access privilege updating procedure 250, additional user information may be necessary and may be obtained from the information system provider database(s) such as the eligibility database 215. The updated access privileges may then be written to the database(s) containing the access privilege data. For example, in one embodiment of the present invention, the LDAP security database 230 may be the appropriate database containing the access privilege information.

After updating a user's access privileges 250 when necessary, the user data page 265 may be updated 260 accordingly. For example, a user Web page 265 may need to be updated 260 to reflect the changes in a user's access privileges 250. Regardless of changes to a user's access privileges 250, a user data page 265 may still need to be updated 260 to reflect changes in the information system. Under either circumstance, updating the data page 265 will vary in separate embodiments of the present invention according to whether shared and/or unique user data pages 265 are used.

As previously stated, the data page 265, such as a Web page, may be unique to a user or may be shared by a number of users matching a particular profile of access privileges. In an exemplary embodiment of the present invention, a separate data page 265 may exist for each user. According to this embodiment, the updating 260 of a data page 265 and/or updating a user's access privileges 250 may only effect the particular user. In an alternative embodiment of the present invention, a plurality of users may share the same data page 265 when the users have the same or similar access privileges and/or contractual relationships with the information system provider (e.g., the users have a shared user profile). As previously stated, a shared data page 265 does not mean that user-specific contract, account, and other information is shared; only that, for example, formatting, applications, features, menu options, and the like are shared. According to this alternative embodiment, updating a user's access privileges 250 and/or a user's data page 260 may result in the user no longer sharing a similar profile with the other users. In this case, the user may be assigned to a shared data page 265 where the updated user information 250, 260 corresponds to another shared user profile or a new data page 265 may need to generated for the user as discussed above.

After the user data page 265 has been updated 260 when necessary, the data page 265 may be displayed 270 for the user thereby completing the extended authentication model for an existing user of the information system.

According to one embodiment of the present invention, periodic validation of user eligibility and/or user access privileges may be performed outside of user attempts to access the information system. At some random, periodic, preprogrammed, or other point in time, the information system may perform some back-end processing to clean up and validate the user information. For example, user login data may be matched to user contractual data referenced when determining user eligibility 210. This user contractual data may be contained in the eligibility database 215 according to one embodiment of the present invention. In other embodiments of the present invention, the user contractual data may be contained in other information system database(s) in addition to or in place of the eligibility database 215. Where user login data exists but a valid contractual (i.e., eligibility) relationship does not, the user login data may be deleted from the information system or otherwise made inactive. Where user login data does not exist but a valid contractual relationship does, the login data may be generated for the user. This periodic validation may be particularly useful in eliminating a situation where a user continues to have login access even though they no longer have a contractual or other relationship with the information system provider (e.g., their contractual relationship has ended or otherwise become inactive).

In another example of periodic validation, user access privileges may be created or assigned 255 to a user before the user first accesses the information system. In one embodiment of the present invention, a data page 265 may also be assigned and/or created (as discussed above) for a user when their access privileges are first determined even outside of the extended authentication model. Performing the initial determination of user access privileges prior to implementing the extended authentication model for a user attempt to access the information system may result in expedited processing of the user authorization.

In a third example of periodic validation, user access privileges may be updated 260 when the user is not accessing the information system. In one embodiment of the present invention, a data page 265 may also be updated (as discussed above) when a user's access privileges are updated outside of the extended authentication model. By updating user access privileges 260 outside of a user attempt to access the information system, the extended authentication model may be expedited when a user attempt to access the information system is made.

The periodic validation of user information outside of a user attempt to access the information system (i.e., outside of the extended authentication model) may include cross-referencing user eligibility information with user security information according to one embodiment of the present invention. For example, in one embodiment of the present invention, user data in the eligibility database 215 may be cross-referenced with user security information 230 and updated accordingly. Performing this cross-referencing may reduce and/or eliminate inconsistencies in user data maintained by the information system provider.

What is claimed is:

1. A method for authenticating a user access to an information system over a communications network, comprising:

validating a user login information item, wherein the user login information item includes at least one of a user identifier and a password;

determining a contractual relationship between a user and an information system provider, wherein the contractual relationship is determined by matching the user login information item with a contractual relationship data item located in at least one database of the information system provider; and validating a status of the determined contractual relationship between the user and the information system provider, wherein the status is validated by examining a contractual relationship status item located in the at least one database of the information system provider.

2. The method according to claim 1, wherein the information system is a Web-based information system.

3. The method according to claim 1, wherein the communications network is an Internet.

4. A method for determining an access privilege of a user over a communications network, comprising:

associating a service with at least one type of a contractual relationship, wherein the type is a category of contractual relationship identified by a first contractual relationship data item located in at least one database of an information system provider;

determining the type of the contractual relationship between a user and an information system provider, wherein the contractual relationship is determined by matching a user login information item with a second contractual relationship data item located in the at least one database of the information system provider and wherein the type of contractual relationship between a user and an information system provider is identified by the first contractual relationship data item located in the at least one database of the information system provider; and granting the access privilege for the service to the user, wherein the service is associated with the at least one type of the contractual relationship between the user and the information system provider.

5. The method according to claim 4, wherein the service is at least one of a program, a feature, a menu item, an object, an application, a set of data, and a link.

6. The method according to claim 4, wherein the communications network is an Internet.

7. A method for generating at least one of a computer system user account, a network user account, and an information system user account, comprising:

determining a contractual relationship between a user and an information system provider, wherein the contractual relationship is determined by matching a user data item with a contractual relationship data item located in at least one database of the information system provider;

validating a status of the determined contractual relationship between the user and the information system provider, wherein the status is validated by examining a contractual relationship status item located in the at least one database of the information system provider; and creating at least one of the computer system user account, the network user account, and the information system user account using information from the status and the contractual relationship.

8. A system for authenticating a user access to an information system, comprising:

a program memory;

a storage device, wherein the storage device contains at least one of a contractual relationship data item and a user login information item; and a processor, wherein the processor is adapted to:
(i) load the contractual relationship data item into the program memory;
(ii) load the user login information item into the program memory;
(iii) load the contractual relationship status item into the program memory;
(iv) validate the user login information item, wherein the user login information item includes at least one of a user identifier and a password;
(v) determine a contractual relationship between a user and an information system provider, wherein the contractual relationship is determined by matching the user login information item with the contractual relationship data item located in at least one database of the information system provider; and
(vi) validate a status of the determined contractual relationship between the user and the information system provider, wherein the status is validated by examining a contractual relationship status item located in the at least one database of the information system provider.

9. A system for determining an access privilege of a user, comprising:
a program memory;
a storage device, wherein the storage device contains a first contractual relationship data item and a second contractual relationship data item; and
a processor, wherein the processor is adapted to:
(i) load the first contractual relationship data item into the program memory;
(ii) load the second contractual relationship data item into the program memory;
(iii) associate a service with at least one type of a contractual relationship, wherein the type is a category of contractual relationship identified by the first contractual relationship data item located in at least one database of an information system provider;
(iv) determine the type of the contractual relationship between a user and an information system provider, wherein the contractual relationship is determined by matching a user login information item with a second contractual relationship data item located in the at least one database of the information system provider and wherein the type of contractual relationship between a user and an information system provider is identified by the first contractual relationship data item located in the at least one database of the information system provider; and
(v) grant the access privilege for the service to the user, wherein the service is associated with the at least one type of the contractual relationship between the user and the information system provider.

10. A system for generating at least one of a computer system user account, a network user account, and an information system user account, comprising:
a program memory;
a storage device, wherein the storage device contains a contractual relationship data item and a contractual relationship status item; and
a processor, wherein the processor is adapted to:
(i) load the contractual relationship data item into the program memory;
(ii) load the contractual relationship status item into the program memory;
(iii) determine contractual relationship between a user and an information system provider, wherein the contractual relationship is determined by matching a user data item with the contractual relationship data item located in at least one database of the information system provider;
(iv) validate a status of the determined contractual relationship between the user and the information system provider, wherein the status is validated by examining the contractual relationship status item located in the at least one database of the information system provider; and
(v) create at least one of the computer system user account, the network user account, and the information system user account using information from the status and the contractual relationship.

11. A medium for storing instructions adapted to be executed by a processor to perform:
determining a contractual relationship between a user and an information system provider, wherein the contractual relationship is determined by matching a user data item with a contractual relationship data item located in at least one database of the information system provider;
validating a status of the determined contractual relationship between the user and the information system provider, wherein the status is validated by examining a contractual relationship status item located in the at least one database of the information system provider; and
creating at least one of the computer system user account, the network user account, and the information system user account using information from the status and the contractual relationship.

12. An apparatus, comprising:
a computer validating a user login information item, wherein the user login information item includes at least one of a user identifier and a password, determining a contractual relationship between a user and an information system provider, wherein the contractual relationship is determined by matching the user login information item with a contractual relationship data item, and validating a status of the determined contractual relationship between the user and the information system provider, wherein the status is validated by examining a contractual relationship status item;
an eligibility database communicatively coupled to the computer, said eligibility database including the contractual relationship data item; and
a security database communicatively coupled to the computer, said security database including the user login information item.

* * * * *